US008574395B2

(12) United States Patent
Tanaka et al.

(10) Patent No.: US 8,574,395 B2
(45) Date of Patent: Nov. 5, 2013

(54) PROTECTION SHEET FOR COATING FILM

(75) Inventors: Atsuhiro Tanaka, Osaka (JP); Fumio Hayakawa, Tokyo (JP); Naoki Kubota, Tokyo (JP); Katsuhiko Ikeda, Tokyo (JP)

(73) Assignees: Lintec Corporation, Tokyo (JP); Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/192,157

(22) Filed: Jul. 27, 2011

(65) Prior Publication Data

US 2011/0284159 A1 Nov. 24, 2011

Related U.S. Application Data

(63) Continuation of application No. 12/280,992, filed as application No. PCT/JP2007/053637 on Feb. 27, 2007, now abandoned.

(30) Foreign Application Priority Data

Feb. 28, 2006 (JP) ................................. 2006-053907

(51) Int. Cl.
B32B 37/12 (2006.01)

(52) U.S. Cl.
USPC .......................................................... 156/329

(58) Field of Classification Search
USPC .......................................................... 156/329
See application file for complete search history.

(56) References Cited

U.S. PATENT DOCUMENTS

| | | | | |
|---|---|---|---|---|
| 4,386,799 A | * | 6/1983 | Molnar | 293/120 |
| 5,308,887 A | * | 5/1994 | Ko et al. | 522/148 |
| 5,464,659 A | | 11/1995 | Melancon et al. | |
| 5,624,763 A | | 4/1997 | Melancon et al. | |
| 5,736,247 A | * | 4/1998 | Takada et al. | 428/424.2 |
| 6,395,390 B1 | * | 5/2002 | Inoue et al. | 428/343 |

FOREIGN PATENT DOCUMENTS

| | | |
|---|---|---|
| EP | 0 519 278 | 12/1992 |
| EP | 0 768 354 | 4/1997 |
| EP | 2088179 A1 A8 | 8/2009 |
| JO | 9-291261 | 11/1997 |
| JP | 3 163143 | 7/1991 |
| JP | 06 023747 | 2/1994 |
| JP | 06 226742 | 2/1994 |
| JP | 06 073352 | 3/1994 |
| JP | 06 184256 | 7/1994 |
| JP | 6 508168 | 9/1994 |
| JP | 08 143830 | 6/1996 |
| JP | 09 104850 | 4/1997 |
| JP | 2701020 | 10/1997 |
| JP | 09 291262 | 11/1997 |
| JP | 10 121002 | 5/1998 |
| JP | 10 121010 | 5/1998 |
| JP | 2832565 | 10/1998 |
| JP | 3342977 | 8/2002 |
| JP | 2002 302664 | 10/2002 |
| JP | 3668322 | 4/2005 |
| JP | 2006-28311 A | 2/2006 |
| JP | 2006-52384 | 2/2006 |

OTHER PUBLICATIONS

Japanese Office Action issued Oct. 18, 2011 in patent application No. JP2006-053907.
Kobayashi Nobuhisa et al., "Releasing Agent Composition", Machine translation of JP 10-219229A, Aug. 18, 1998.
"Facts on File-Sillicone Pressure Sensitive Adhesive Cure Systems", Dow Corning 2005.

* cited by examiner

Primary Examiner — Daniel McNally
(74) Attorney, Agent, or Firm — Oblon, Spivak, McClelland, Maier & Neustadt, L.L.P.

(57) ABSTRACT

Provided is a protective sheet for a coating layer comprising a substrate sheet and provided thereon a pressure-sensitive adhesive layer, which can be applied as well to a coated surface insufficiently cured immediately after dried, and the pressure-sensitive adhesive layer described above comprises an addition reaction type silicone-based pressure-sensitive adhesive.

5 Claims, No Drawings

PROTECTION SHEET FOR COATING FILM

CROSS-REFERENCE TO RELATED APPLICATIONS

The present application is a continuation of U.S. patent application Ser. No. 12/280,992, filed on Aug. 28, 2008, which is a 35 U.S.C. §371 National Stage patent application of International patent application PCT/JP2007/053637, filed on Feb. 27, 2007, which claims priority to Japanese patent application JP 2006-053907, filed on Feb. 28, 2006.

TECHNICAL FIELD

The present invention relates to a protective sheet for a coating layer, more specifically to a protective sheet for a coating layer which does not allow coating layers applied on automotive bodies and parts of automobiles to change in quality or discolor and which is excellent in a stripping property after adhered for a long period of time.

The protective sheet for a coating layer according to the present invention is a protective sheet capable of being applied as well to a coating layer of a urethane-based coating material in which a small amount of a solvent remains due to insufficient drying and which is insufficiently cured after drying, and it is particularly useful as a protective sheet for coated plastic-made parts such as bumpers and the like.

BACKGROUND ART

When transporting cars, brought about are the inconveniences that the coating layers of car bodies and parts become lusterless, discolored and damaged due to suspended matters such as dirts and dusts, rain, grass pollen and the like, colliding matters such as sands and the like and contact by workers. In order to prevent such inconveniences, wax-based materials are applied on the coating layers of car bodies and parts of automobiles, or protective sheets are adhered thereon.

However, in heating and curing coating layers applied on car bodies and parts, the curing reaction of the coating layers does not sufficiently proceed in a certain case even after passing through a drying furnace.

Among them, in the case of a bumper which is one of parts for automobiles, synthetic resin-made bumpers have come to be used in place of conventional metal-made ones in order to reduce a weight thereof, and the above synthetic resin-made bumpers are usually coated in order to improve its appearance. In the case of the above synthetic resin-made bumpers, protective sheets are adhered thereon as well in order to prevent the inconveniences described above.

However, in heating and curing coating layers applied on synthetic resin-made bumpers, the curing temperature can not be elevated in order to avoid adverse affections such as deterioration and deformation of the resin. Accordingly, the coating layers on the coated resin-made bumpers are insufficiently dried even after passing through a drying furnace, and therefore a small amount of the solvent remains or the curing reaction does not sufficiently proceed in a certain case.

When adhering a protective sheet on a coating layer in such state, brought about are problems such as "stepping (the phenomenon that deformations brought about by fine wrinkles and lifting produced on the sheet in adhering the protective sheet are transferred onto the coating layer, whereby the coating layer is deformed)", "whitening (the phenomenon that deviation is caused in the composition of the coating layer due to affinity thereof with a pressure-sensitive adhesive layer of the sheet and that the coating layer looks white when stripping the sheet)" and "adhesive deposit (the phenomenon that the pressure-sensitive adhesive layer is partially transferred onto the coating layer when stripping the sheet)".

Proposed as a protective sheet for a coating layer are a sheet prepared by providing a layer of a polyisobutylene-based pressure-sensitive adhesive on a substrate for supporting (for example, a Patent Document 1), a sheet prepared by providing a layer of a pressure-sensitive adhesive comprising butyl rubber or a styrene-ethylene.butylene-styrene block copolymer on a substrate for supporting (for example, a Patent Document 2), a sheet prepared by providing a layer of a composition obtained by mixing a polyisobutylene-based pressure-sensitive adhesive with a small amount of an acrylic-based pressure-sensitive adhesive on a substrate for supporting (for example, a Patent Document 3), a sheet prepared by providing a layer of a composition obtained by blending an acrylic-based pressure-sensitive adhesive with a multifunctional isocyanate compound on a substrate for supporting (for example, a Patent Document 4), a sheet prepared by providing an ethylene-vinyl acetate-glycidyl methacrylate copolymer on a substrate for supporting (for example, a Patent Document 5) and a sheet prepared by providing a pressure-sensitive adhesive layer obtained by photo-curing a resin comprising a principal component of an ionomer obtained by subjecting an ethylene-methacrylic acid copolymer to intermolecular bonding with metal ions on a substrate for supporting (for example, a Patent Document 6).

However, the performances of the protective sheets for a coating layer which have the pressure-sensitive adhesive layers described above are not still satisfactory.

Patent Document 1: U.S. Pat. No. 2,701,020
Patent Document 2: U.S. Pat. No. 3,668,322
Patent Document 3: U.S. Pat. No. 2,832,565
Patent Document 4: U.S. Pat. No. 3,342,977
Patent Document 5: JP 1998-121002A
Patent Document 6: JP 1998-121010A

DISCLOSURE OF THE INVENTION

In light of the situation described above, an object of the present invention is to solve the problems described above in a protective sheet for a coating layer by using a pressure-sensitive adhesive component totally different from the various pressure-sensitive adhesive components described above which have so far been used.

Intensive researches repeated by the present inventor have resulted in finding that the above object can be achieved by using a protective sheet prepared by applying a pressure-sensitive adhesive layer comprising an addition reaction type silicone-based on a substrate sheet, and thus the present inventor has completed the present invention.

That is, the present invention provides the following items (1) to (7):

(1) a protective sheet for a coating layer comprising a substrate sheet and provided thereon a pressure-sensitive adhesive layer, wherein the pressure-sensitive adhesive layer comprises an addition reaction type silicone-based pressure-sensitive adhesive,
(2) the protective sheet as described in the above item (1), wherein the addition reaction type silicone-based pressure-sensitive adhesive further contains a curing catalyst,
(3) the protective sheet as described in the above item (1) or (2), wherein the curing catalyst is a platinum-based catalyst,
(4) the protective sheet as described in the above item (1) or (2), wherein the substrate sheet is a polyethylene terephthalate sheet, (5) the protective sheet as described in the above item (1) or (2), wherein the pressure-sensitive adhesive layer is cross-linked by heating or irradiating with an active energy beam,
(6) the protective sheet as described in the above item (1) or (2), wherein it is a protective sheet for a coating layer which is applied on cars and
(7) the protective sheet as described in the above item (1) or (2), wherein it is a protective sheet for a urethane-based coating layer which is applied on resin-made bumpers.

According to the present invention, capable of being provided is a protective sheet for a coating layer which is less liable to allow coating layers applied on car bodies and parts of automobiles to change in quality or discolor and which is excellent in a stripping property after adhered for a long period of time. In particular, it is useful as a protective sheet for coating layers in which a small amount of a solvent remains due to insufficient drying immediately after drying in plastic-made parts such as coated bumpers and the like and which are insufficiently cured.

BEST MODE FOR CARRYING OUT THE INVENTION

An addition reaction type silicone-based adhesive which is provided on the protective sheet for a coating layer according to the present invention shall be explained. The addition reaction type silicone-based adhesive comprises a base resin and a cross-linking agent.

The addition reaction type silicone-based pressure-sensitive adhesive in the present invention has the advantage that it can be used after only primary curing at low temperatures and does not require secondary curing at high temperatures.

In this regard, conventional peroxide curing type silicone-based adhesives require secondary curing at a high temperature of 150° C. or higher.

Accordingly, it becomes possible to produce a protective sheet at relatively low temperature in the present invention and is excellent in an economical efficiency of energy, and it becomes possible as well to produce a protective sheet using a substrate sheet having a relatively low heat resistance. Further, by-products are not produced in curing as is the case with peroxide curing type silicone-based pressure-sensitive adhesives, and therefore problems of odor and corrosion are not brought about.

The addition reaction type silicone-based pressure-sensitive adhesive in the present invention has a low adhesive strength as compared with those of conventional peroxide curing type silicone-based pressure-sensitive adhesives, and therefore it has the preferred characteristic that it does not exert an adverse affection on the coating layer surface when peeled after finishing use of the protective sheet.

The addition reaction type silicone-based pressure-sensitive adhesive in the present invention comprises usually a base resin comprising a mixture of a silicone resin component and a silicone rubber component, a hydrosilyl group (SiH)-containing cross-linking agent and a curing catalyst which is used if necessary.

Among them, the silicone resin component is an organopolysiloxane having a reticulate structure which is obtained by hydrolyzing an organochlorosilane or an organoalkoxysilane and then subjecting it to dehydration condensation reaction. The silicone rubber component is a diorganopolysiloxane having a straight chain structure. The organo group includes methyl, ethyl, propyl, butyl, phenyl and the like in both cases of the silicone resin component and the silicone rubber component. The organo groups described above are partially substituted with an unsaturated group such as a vinyl group, a hexenyl group, an allyl group, a butenyl group, a pentenyl group, an octenyl group, a (meth)acryloyl group, a (meth)acryloylmethyl group, a (meth)acryloylpropyl group, a cyclohexenyl group and the like. The silicone rubber components having a vinyl group which are readily available in an industrial scale are preferred. In the adhesive containing the above addition reaction type silicone, cross-linking proceeds by addition reaction of an unsaturated group with a hydrosilyl group, and a reticulate structure is formed, whereby a pressure-sensitive adhesiveness is developed.

The number of the unsaturated group such as a vinyl group is usually 0.05 to 3.0 pieces, preferably 0.1 to 2.5 pieces based on 100 pieces of organo group. The number of the unsaturated group controlled to 0.05 piece or more prevents the reactivity with a hydrosilyl group from lowering to make curing less liable to proceed and provides the pressure-sensitive adhesive with a suited adhesive strength. On the other hand, the number thereof controlled to 3.0 pieces or less elevates a cross-linking density of the pressure-sensitive adhesive and increases an adhesive strength thereof, so that an adverse affection is prevented from being exerted on coating layers applied on car bodies and the like.

The diorganopolysiloxane includes, to be specific, KS-3703 (having 0.6 piece of vinyl group based on 100 pieces of methyl group) manufactured by Shin-Etsu Chemical Co., Ltd. and BY23-753 (having 0.1 piece of vinyl group based on 100 pieces of methyl group) and BY24-162 (having 1.4 piece of vinyl group based on 100 pieces of methyl group) each manufactured by Dow Corning Toray Co., Ltd. Further, SD4560PSA, SD4570PSA, SD4580PSA, SD4584PSA, SD4585PSA, SD4587L and SD4592PSA each manufactured by Dow Corning Toray Co., Ltd. can be used as well.

As described above, the organopolysiloxane which is the silicone resin component is used usually in a mixture with the silicone rubber component, and the silicone rubber component includes KS-3800 (having 7.6 pieces of vinyl group based on 100 pieces of methyl group) manufactured by Shin-Etsu Chemical Co., Ltd. and BY24-162 (having 1.4 piece of vinyl group based on 100 pieces of methyl group), BY24-843 (having no unsaturated groups) and SD-7292 (having 5.0 pieces of vinyl group based on 100 pieces of methyl group) each manufactured by Dow Corning Toray Co., Ltd.

The specific examples of the addition reaction type silicone described above are described in, for example, JP1998-219229A.

A blending ratio of the silicone resin component to the silicone rubber component is usually 250 parts by mass or less for the latter based on 100 parts by mass for the former. The blending ratio controlled to 250 parts by mass or less for the latter prevents an adverse affection from being exerted on coating layers applied on car bodies and the like.

The cross-linking agent is blended so that the number of hydrogen atoms bonded to a silicon atom is usually 0.5 to 10, preferably 1 to 2.5 based on one group of an unsaturated group such as a vinyl group in the silicone resin component and the silicone rubber component. The number of hydrogen atoms controlled to 0.5 or more prevents reaction of an unsaturated group such as a vinyl group with a hydrosilyl group from not completely proceeding to make curing inferior. The number of hydrogen atoms controlled to 10 or less prevents the cross-linking agent from remaining without reacting to exert an adverse affection on coating layers applied on car bodies and the like.

A curing catalyst is preferably blended with the pressure-sensitive adhesive applied on the protective sheet for a coating layer according to the present invention in addition to the addition reaction type silicone component (comprising the silicone resin component and the silicone rubber component) and the cross-linking agent each described above. The addition reaction type silicone-based adhesive in the present invention does not have a functional group such as a silanol group having a reactivity with an isocyanate group, and therefore it can be adhered even when a coating layer is insufficiently cured and does not exert an adverse affection on the coating layer when stripping the protective sheet.

The above curing catalyst is used in order to accelerate hydrosilylation reaction of an unsaturated group in the silicone resin component and the silicone rubber component with an Si—H group in the cross-linking agent.

The curing catalyst includes a platinum-based catalysts, that is, chloroplatinic acid, an alcohol solution of chloroplatinic acid, reaction products of chloroplatinic acid with an alcohol solution, reaction products of chloroplatinic acid with olefin compounds, reaction products of chloroplatinic acid with vinyl group-containing siloxane compounds, platinum-olefin complexes, platinum-vinyl group-containing siloxane complexes, platinum-phosphorus complexes and the like. The specific examples of the curing catalysts described above are described in, for example, JP2006-28311A and JP1998-147758A.

More specifically, they include commercial products such as SRX-212 manufactured by Dow Corning Toray Co., Ltd., PL-50T manufactured by Shin-Etsu Chemical Co., Ltd. and the like.

An amount to be blended of the curing catalyst is usually 5 to 2000 ppm, preferably 10 to 500 ppm in terms of a platinum content based on the total amount of the silicone resin component and the silicone rubber component. An amount to be blended of the curing catalyst controlled to 5 ppm or more prevents the curing property from being reduced to result in a reduction in the cross-linking density, that is, a reduction in the cohesion. On the other hand, an amount to be blended thereof controlled to 2000 ppm or less prevents an increase in the cost and makes it possible to maintain a stability of the pressure-sensitive adhesive layer, and it prevents the curing catalyst which is used in excess from exerting an adverse affection on coating layers applied on car bodies and the like.

In addition to the components described above, various additives can be added as optional components to the addition reaction type silicone-based adhesive in the present invention as long as characteristics required to the protective sheet for a coating layer are not damaged. The additives include non-reactive polyorganosiloxanes such as dimethylsiloxane and dimethyldiphenylsiloxane, antioxidants of a phenol base and others, light stabilizers of a benzotriazole base, flame retardants of a phosphoric ester base and others, antistatic agents such as cationic surfactants, inert solvents such as toluene and xylene which are used in order to reduce a viscosity when applying the pressure-sensitive adhesive, colorants and fillers.

In the addition reaction type silicone-based pressure-sensitive adhesive described above, a pressure-sensitive adhesive strength is developed even at room temperature by blending the respective components described above, but it is preferred from the viewpoint of a stability of the pressure-sensitive adhesive strength to apply the above pressure-sensitive adhesive on a release sheet or a substrate sheet described later, stick both together and then heat or irradiate it with an active energy beam to accelerate cross-linking reaction of the silicone resin component with the silicone rubber component by the cross-linking agent.

It is to be noted that the energy beam means beams having an energy quantum among electromagnetic waves and charged particle beams, that is, an active light such as a UV ray or an electron beam. When cross-linking is carried out by irradiating with an electron beam, a photopolymerization initiator is not required, but when cross-linking is carried out by irradiating with an active light such as a UV ray, a photopolymerization initiator is preferably allowed to be present.

The photopolymerization initiator used when irradiated with a UV ray shall not specifically be restricted, and optional photopolymerization initiators suitably selected from photopolymerization initiators which have so far been conventionally used for UV ray-curing type resins can be used. The photopolymerization initiator includes, for example, benzoins, benzophenones, acetophenones, α-hydroxyketones, α-aminoketones, α-diketones, α-diketonedialkylacetals, anthraquinones, thioxanthones and other compounds.

The photopolymerization initiators may be used alone or in combination of two or more kinds thereof. A use amount thereof is selected in a range of usually 0.01 to 30 parts by mass, preferably 0.05 to 20 parts by mass based on 100 parts by mass of the total amount of the addition reaction type silicone component which is used as a base resin and the cross-linking agent each described above.

The protective sheet for a coating layer having a stable adhesive strength is obtained by heating or irradiating with an active energy beam for cross-linking.

After applying the pressure-sensitive adhesive on the release sheet, it may be stuck together with the substrate sheet, or after applying the pressure-sensitive adhesive on the substrate sheet, it may be stuck together with the release sheet.

Used as the substrate sheet are a polyethylene terephthalate sheet, a polyethylene naphthalate sheet, a polyimide sheet, a polyetherimide sheet, a polyaramide sheet, a polyetherketone sheet, a polyether.etherketone sheet, a polyphenylene sulfide sheet, a poly(4-methylpentene-1) sheet and the like. Polyethylene terephthalate and polyethylene naphthalate are preferred from the viewpoints of a heat resistance, a dimensional stability and an economical efficiency.

A thickness of the substrate sheet is somewhat different depending on a material used, and it is usually 5 to 300 μm, preferably 10 to 100 μm. In the case of a polyethylene terephthalate sheet which is one of the preferred substrate sheets, the thickness is 10 to 50 μm.

The pressure-sensitive adhesive can be applied on the release sheet or the substrate sheet by a gravure coating method, a bar coating method, a spray coating method, a spin coating method, a roll coating method, a die coating method, a knife coating method, an air knife coating method, a hot melt coating method, a curtain coating method and the like which are usually carried out.

A thickness of the pressure-sensitive adhesive layer after drying which is formed on the release sheet or the substrate sheet is usually 1 to 50 μm, preferably 5 to 40 μm. Controlling a thickness of the pressure-sensitive adhesive layer to 1 μm or more makes it possible to secure an adhesive strength and a cohesion (holding power) which are required to the protective sheet for a coating layer, and controlling it to 50 μm or less avoids an increase in the cost and prevents the pressure-sensitive adhesive layer from protruding beyond the edges.

The pressure-sensitive adhesive layer is formed on the release sheet or the substrate sheet to superpose both together, and then it is heated or irradiated with an energy beam as described above to cross-link the silicone resin component with the silicone rubber component, whereby it can be provided with a stable adhesive strength.

The heating temperature in accelerating cross-linking by heating is usually 60 to 140° C., preferably 80 to 130° C. Heating at 60° C. or higher prevents the pressure-sensitive adhesive strength from being unsatisfactory due to insufficient cross-linking of the silicone resin component with the silicone rubber component, and heating at 140° C. or lower prevents thermal shrinkage from being brought about on the substrate sheet and prevents the pressure-sensitive adhesive deterioration and discoloration from taking place.

An accelerating voltage of an electron beam in carrying out cross-linking by irradiating with an electron beam which is one of active energy beams is usually 130 to 300 kV, preferably 150 to 250 kV. Irradiation at an accelerating voltage of 130 kV or more makes it possible to prevent the adhesive strength from being unsatisfactory due to insufficient cross-linking of the silicone resin component with the silicone rubber component, and irradiation at an accelerating voltage of 300 kV or less makes it possible to prevent the pressure-sensitive adhesive layer and the substrate sheet from being deteriorated or discolored. The preferred range of the beam current is 1 to 100 mA.

A dosage of the electron beam to be irradiated is preferably 1 to 70 Mrad, more preferably 2 to 20 Mrad. Irradiation at a dosage of 1 Mrad or more makes it possible to prevent the pressure-sensitive adhesive layer and the substrate sheet from being deteriorated or discolored and prevent the pressure-sensitive adhesiveness from being unsatisfactory due to insufficient cross-linking. Irradiation at a dosage of 70 Mrad or less makes it possible to prevent the cohesion from being reduced by deterioration or discoloration of the pressure-sensitive adhesive layer and prevent the substrate sheet from being deteriorated or shrunk.

A dosage in the case of irradiating with a UV ray is suitably selected. A light quantity thereof is 100 to 500 mJ/cm$^2$, and an illuminance thereof is 10 to 500 mW/cm$^2$.

Heating and irradiation with an active energy beam are preferably carried out under nitrogen atmosphere in order to prevent the reaction from being disturbed by oxygen.

As described above, the stable adhesive strength is provided by heating or irradiating with an active energy beam to cross-link the silicone resin component with the silicone rubber component.

The substrate sheet is preferably subjected to corona discharge treatment and/or ozone treatment before the substrate sheet is superposed onto the surface of the pressure-sensitive adhesive layer applied on the release sheet or before applying the pressure-sensitive adhesive on the substrate sheet in order to strengthen a close adhesiveness between the pressure-sensitive adhesive layer and the substrate sheet from the viewpoint of preventing the "adhesive deposit" phenomenon that the pressure-sensitive adhesive layer is partially transferred onto the coating layer when stripping the protective sheet for a coating layer according to the present invention from coated surfaces of car bodies and parts of automobiles.

Capable of being used as the release sheet are resin films of polyethylene terephthalate, polyethylene, polypropylene and the like which are coated with a releasing agent such as a fluorine-based resin, a silicone-based resin, a long chain alkyl group-containing carbamate and the like.

A thickness of the release sheet is somewhat different depending on the materials used, and it is usually 10 to 250 μm, preferably 20 to 200 μm.

EXAMPLES

Hereinafter, the present invention is explained in further details with reference to examples, but the present invention shall by no means be restricted thereto.

Example 1

A polyethylene terephthalate film "PET25T70 manufactured by Toray Industries, Inc." having a thickness of 25 μm was used as a substrate sheet for the protective sheet, and a polyethylene terephthalate film "SP-PET38YSD manufactured by Lintec Corporation" having a thickness of 38 μm which was coated with a fluororesin was used as a release sheet.

Used as the addition reaction type silicone-based adhesive was a solution prepared by diluting with 100 parts by mass of toluene, a solution containing 100 parts by mass of SD4585PSA (addition reaction type silicone containing a cross-linking agent) manufactured by Dow Corning Toray Co., Ltd. and 0.9 part by mass of SRX-212 manufactured by Dow Corning Toray Co., Ltd. which was a platinum-based curing catalyst.

The solution described above was applied on the surface of the substrate sheet described above by a knife coating method so that a thickness after drying was 30 μm and dried at 130° C. for 5 minutes, and then the substrate sheet was stuck together with a fluororesin-coated surface of the release sheet described above to prepare a protective sheet for a coating layer.

Example 2

The same substrate sheet and release sheet as used in Example 1 were used to carry out the following procedure.

Used as the addition reaction type silicone-based adhesive was a solution prepared by diluting with 100 parts by mass of toluene, a solution containing 100 parts by mass of SD4585PSA (an addition reaction type silicone containing a cross-linking agent) manufactured by Dow Corning Toray Co., Ltd., 10 parts by mass of SD4587LPSA (an addition reaction type silicone containing a cross-linking agent) manufactured by Dow Corning Toray Co., Ltd. and 1 part by mass of SRX-212 manufactured by Dow Corning Toray Co., Ltd. which was a platinum-based curing catalyst.

The solution described above was applied on the surface of the substrate sheet described above by a knife coating method so that a thickness after drying was 30 μm and dried at 130° C. for 5 minutes, and then a layer side which was a pressure-sensitive adhesive layer was irradiated with an electron beam at an accelerating voltage of 200 kV, a beam current of 20 mA and a dosage of 5 Mrad under nitrogen atmosphere. Then, the substrate sheet was stuck together with a fluororesin-coated surface of the release sheet described above to prepare a protective sheet for a coating layer.

Example 3

A protective sheet for a coating layer was prepared in the same manner as in Example 1, except that a polyethylene terephthalate film "PET25T Q37 manufactured by Toray Industries, Inc." having a thickness of 25 μm which contains a UV absorbent was used as a substrate sheet.

Comparative Example 1

A polyethylene film (trade name: PE Wadatoumei 50ASKAI4, manufactured by J-Film Corporation) having a thickness of 50 μm which contains an antistatic agent was used as a substrate sheet for the protective sheet, and a polyethylene terephthalate film (SP-PET3801, manufactured by Lintec Corporation) having a thickness of 38 μm which was coated with a silicone resin was used as a release sheet.

Used as pressure-sensitive adhesive was a solution prepared by mixing 100 parts by mass of an acrylic-based pressure-sensitive adhesive obtained by diluting a butyl acrylate-acrylic acid copolymer (butyl acrylate/acrylic acid mole ratio: 10/1) having a weight average molecular weight of 600,000 to 30% by mass with ethyl acetate and 5 parts by mass of a 5% by mass ethyl acetate solution of 1,3-bis(N,N-diglycidylaminomethyl)cyclohexane as a cross-linking agent.

The above solution was applied on a silicone resin-coated surface of the release sheet described above by a knife coating method so that a thickness after drying was 20 μm and dried at 90° C. for 3 minutes, and then the release sheet was stuck together with the substrate sheet described above to prepare a protective sheet for comparison.

Comparative Example 2

A protective sheet for comparison was prepared in the same manner as in Comparative Example 1, except that used as a pressure-sensitive adhesive was a solution obtained by diluting a rubber base pressure-sensitive adhesive comprising a polyisobutylene having a viscosity average molecular weight of 800,000 to 30% by mass with toluene and that the cross-linking agent was not used.

The protective sheets obtained in the examples and the comparative examples described above were used to carry out the following tests, and the results obtained are shown in Table 1.

<Evaluated Items and Methods for Evaluating>

A double liquid type polyurethane-based top coating material for automobiles (prepared by mixing 100 parts by mass of Rock Multi Top Clear SF-150-5150 with 50 parts by mass of Rock Multi Top Clear S curing agent standard 150-5120 each manufactured by Rock Paint Co., Ltd.) was sprayed in a thickness of about 1 μm on a plate of a polyolefin base thermosetting elastomer on which an electrodepositing primer and an intermediate coating material were applied. It was dried at 60° C. for 10 minutes and left standing at room temperature for 30 minutes, and then the respective protective sheets obtained in the examples and the comparative examples which were cut into a tape shape were adhered on the coating layer. The sheets of a tape shape which were adhered on the coated surfaces with wrinkled parts were left standing at room temperature for 24 hours and then peeled, and the states of the coating layer were visually observed to evaluate the respective characteristics according to the following criteria.

(1) Stepping of a Wrinkle Part
  ○: Step can not be confirmed
  Δ: Step can be confirmed, and a vertical interval of stepping is 0.3 to 1 μm
  X: Step can be confirmed, and a vertical interval of stepping is 1 μm or more
(2) Boundary Between a Sheet-Adhered Part and a No Adhered Part
  ○: Boundary can not be confirmed.
  Δ: Boundary can slightly be confirmed.
  X: Boundary can clearly be confirmed.
(3) Whitening of an Adhesive Contact Surface
  ○: Whitening can not be confirmed.
  Δ: Whitening can be confirmed but can not be confirmed after left standing outdoors for one week.
  X: Whitening can be confirmed and can be still confirmed even after left standing outdoors for one week.
(4) Adhesive Deposit
  ○: Adhesive deposit can not be confirmed on the coated surface.
  Δ: Adhesive deposit can slightly be confirmed on the coated surface.
  X: Adhesive deposit can notably be confirmed on the coated surface.

TABLE 1

|  | Examples | | | Comparative Examples | |
| --- | --- | --- | --- | --- | --- |
|  | 1 | 2 | 3 | 1 | 2 |
| Stepping of wrinkle part | ○ | ○ | ○ | X | Δ |
| Boundary between sheet-adhered part and no adhered part | ○ | ○ | ○ | X | Δ |
| Whitening of adhesive contact surface | ○ | ○ | ○ | X | Δ |
| Adhesive deposit | ○ | ○ | ○ | X | Δ |

As apparent from the results shown in Table 1, it can be found that the protective sheets for a coating layer according to the present invention obtained in the examples are excellent in all characteristics as compared with those of the protective sheets obtained in the comparative examples.

INDUSTRIAL APPLICABILITY

The protective sheet for a coating layer according to the present invention can be applied as well to a coating layer of a urethane-based coating material which is insufficiently cured, and in particular, it can suitably be used as a protective sheet for coated plastic-made parts such as bumpers and the like.

What is claimed is:
1. A method comprising:
  applying a protective sheet to a urethane-based coating layer provided on a resinous bumper of an automobile:
wherein:
  the protective sheet comprises:
    a substrate sheet; and
    a pressure-sensitive adhesive layer on the substrate; and
  the pressure-sensitive adhesive layer consists essentially of a silicone-based pressure-sensitive adhesive that is curable by an addition reaction, and that is free of functional groups having reactivity with isocyanate groups.
2. The method according to claim 1, wherein the silicone-based pressure-sensitive adhesive comprises a curing catalyst.
3. The method according to claim 2, wherein the curing catalyst is a platinum-based catalyst.
4. The method according to claim 1, wherein the substrate sheet is a polyethylene terephthalate sheet.
5. The method according to claim 1, wherein the pressure-sensitive adhesive layer is cross-linked by heating or irradiating with an active energy beam.

* * * * *